United States Patent [19]
Zelt, III et al.

[11] Patent Number: 5,857,031
[45] Date of Patent: Jan. 5, 1999

[54] METHOD AND APPARATUS FOR MONITORING AND INSPECTING STRIP EDGE

[75] Inventors: Albert R. Zelt, III, Bethel Park; Robert M. Klawonn; Paul S. Laskey, both of Pittsburgh, all of Pa.

[73] Assignee: ASKO, Inc., Duquesne, Pa.

[21] Appl. No.: 588,625

[22] Filed: Jan. 19, 1996

Related U.S. Application Data

[63] Continuation-in-part of Ser. No. 583,454, Jan. 5, 1996.

[51] Int. Cl.$^6$ ..................................................... G06K 9/00
[52] U.S. Cl. ............................................ 382/152; 382/108
[58] Field of Search ..................................... 382/108, 141, 382/152, 199, 218; 348/86, 88, 92, 125, 128–130; 364/474.11, 474.16, 474.17, 474.35; 356/35, 69, 237, 376, 394, 396; 29/83; 250/559, 562, 563; 83/518; H04N 7/18

[56] References Cited

U.S. PATENT DOCUMENTS

| | | | |
|---|---|---|---|
| 3,312,135 | 4/1967 | Mraz | 83/675 |
| 3,730,043 | 5/1973 | Zimmermann | 83/502 |
| 4,497,192 | 2/1985 | Reizig et al. | 72/203 |
| 4,667,550 | 5/1987 | Eiting | 83/56 |
| 5,125,741 | 6/1992 | Okada et al. | 356/237 |
| 5,136,906 | 8/1992 | Antonissen et al. | 83/42 |
| 5,267,168 | 11/1993 | Antonissen et al. | 364/468 |
| 5,311,276 | 5/1994 | Masao et al. | 356/237 |

OTHER PUBLICATIONS

"Improved Coil Slitting Cutters", Sheet Metal Industries, Mar. 1973, 2 pages.

*Primary Examiner*—Leo H. Boudreau
*Assistant Examiner*—Christopher S. Kelley
*Attorney, Agent, or Firm*—Reed Smith Shaw & McClay LLP

[57] ABSTRACT

A method of monitoring and inspecting an edge of strip metal includes providing at least one image producer having a field of view that substantially frames the edge, using the at least one image producer to form a first series of images of the edge after the edge has been formed by a knife; and analyzing in real time the first series of images to determine the shear angle and/or the burr height of the edge.

13 Claims, 3 Drawing Sheets

METHOD AND APPARATUS FOR MONITORING AND INSPECTING STRIP EDGE

CROSS-REFERENCE TO RELATED APPLICATION

This application is a continuation-in-part of an application Ser. No. 08/583,454 filed on Jan. 5, 1996, and titled "Method and Apparatus for Monitoring and Inspecting Rotary Knives," the contents of which are hereby incorporated by reference.

BACKGROUND OF THE INVENTION

The present invention relates generally to metal strip edge and, more particularly, to a method and apparatus for monitoring and inspecting in real time various characteristics of the strip edge.

Strip metal is a commodity that is commonly produced by the metals industry. Typically, various operations must be performed on the metal strip before the strip can be processed into one or more final products. Operations typically performed on metal strip include edge-trimming, slitting, shearing and stamping operations.

In a slitting operation, a wide, metal strip is cut into any suitable number of narrower strips. Likewise, in an edge-trimming operation, a metal strip of, usually, non-uniform width is trimmed to a desired width. Slitting and edge-trimming operations are typically performed by rotary cutting knives mounted, respectively, above and below the strip at a desired location for cutting or trimming same. In the above-noted operations, new edges for the metal strip are produced thereby.

It is important for a number of reasons to obtain high-quality strip edges from the above-noted operations. For example, low-quality edges may subsequently crack or rust, or cause subsequent coating or welding problems, or reduce the "fit and finish" of the strip, all of which results in increased processing costs and scrap rates.

In slitting and edge-trimming operations, the quality of the edge is usually dependent on the setting or positioning of the knives. For example, the upper knife can be adjusted vertically to create a desired amount of overlap with the lower knife. In addition, the lower knife can be adjusted horizontally to adjust the amount of clearance between the upper and lower knives.

Customarily, the knives are initially positioned and subsequently adjusted according to settings which, from empirical experience with strip of the same thickness and metallurgical composition, are thought to be correct. In addition, the edges of strip produced by the knives are periodically manually and visually inspected to determine whether the knives are properly set and otherwise in good working order (e.g., the knife edges are sharp and defect-free).

Because strip edge inspection has only been done periodically and not in real time, a number of strip metal coils may be processed before a problem with one or more of the knives is detected. This can lead to many of the strip metal coils being scrapped or reworked if the edge quality has become unacceptable.

SUMMARY OF THE INVENTION

The present invention provides a method and apparatus for monitoring and inspecting, in real time, various characteristics of strip edge that can be influenced by improper knife settings or worn or degraded knives. By continuously monitoring in real time the strip edge produced by the knives, the knives can be timely adjusted or replaced when they begin to operate outside of normal operating parameters, thereby preventing the unnecessary scrapping or subsequent re-working of the metal strip.

According to a first aspect of the present invention, a method of monitoring and inspecting an edge of strip metal includes the following steps: providing at least one image producer having a field of view that substantially frames the edge; using the at least one image producer to form a first series of images of the edge after the edge has been formed by at least one knife; and analyzing in real time the first series of images to determine the shear angle of the edge.

According to a dependent aspect of the present invention, the method of monitoring further includes the steps of: comparing the shear angle to a standard operating parameter for shear angle; determining whether the shear angle is within the standard operating parameter; and alerting an operator if the shear angle is not within the standard operating parameter.

According to a second aspect of the present invention, an apparatus for monitoring and inspecting an edge of strip metal includes at least one image producer having a field of view that substantially frames the edge. The at least one image producer is operable to form a first series of images of the edge after the edge has been formed by at least one knife. In addition, the apparatus includes an analyzer that is connectively associated with said at least one image producer. The analyzer is operable to determine in real time the shear angle of the edge and to compare the shear angle to a standard operating parameter for shear angle.

According to a third aspect of the present invention, a method of monitoring and inspecting an edge of strip metal includes the following steps: providing at least one image producer having a field of view that substantially frames the edge; using the at least one image producer to form a first series of images of the edge after the edge has been formed by at least one knife; and analyzing in real time the first series of images to determine the burr height of the edge.

According to a fourth aspect of the present invention, an apparatus for monitoring and inspecting an edge of strip metal includes at least one image producer having a field of view that substantially frames the edge. The at least one image producer is operable to form a first series of images of the edge after the edge has been formed by at least one knife. In addition, the apparatus includes an analyzer that is connectively associated with said at least one image producer. The analyzer is operable in real time to determine the burr height of the edge and to compare the burr height to a standard operating parameter for burr height.

By continuously monitoring and inspecting in real time various characteristics of strip edge, including shear angle and burr height, line operators will be able to determine when rotary knives need to be replaced or readjusted before poor edge-quality occurs in strip edge. Such monitoring and consequent knife replacement or adjustment will result in lowered reprocessing costs and scrap rates for strip edge.

The present invention, together with further objects and attendant advantages, will best be understood by reference to the following detailed description, taken in conjunction with the accompanying drawings.

DETAILED DESCRIPTION OF THE PRESENTLY PREFERRED EMBODIMENTS

The present invention is described below in terms of an edge-trimming operation for metal strip. However, it should be understood that the apparatus and method of the present invention may be adapted for use in any suitable operation wherein metal or other strip is processed such that a strip edge is formed thereby.

Figure 1A:
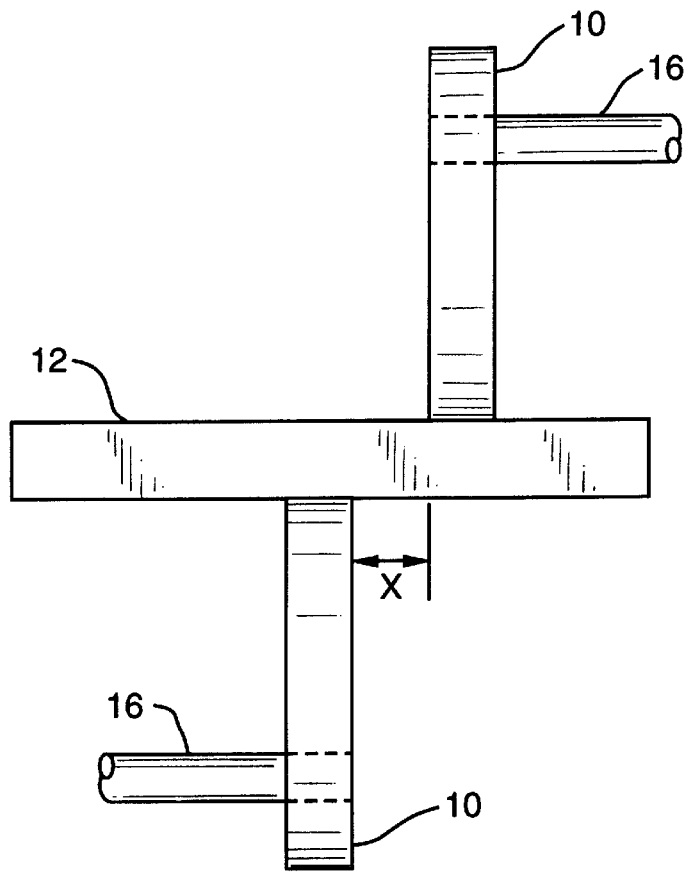
FIGS. 1a–1c are various operational views of a pair of rotary knives edge-trimming a metal strip.
Figure 1B:
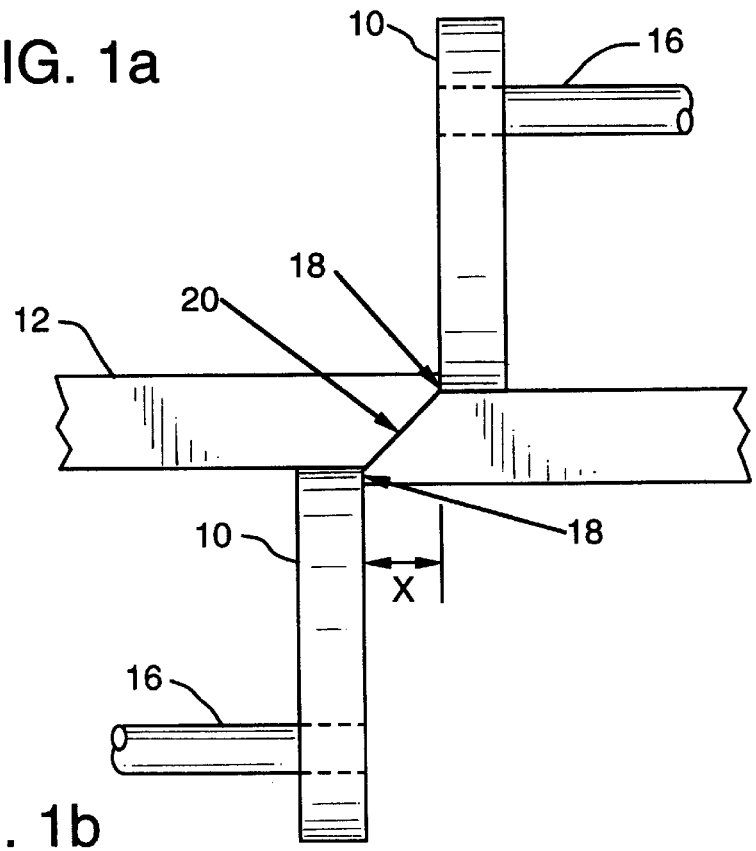
Figure 1C:
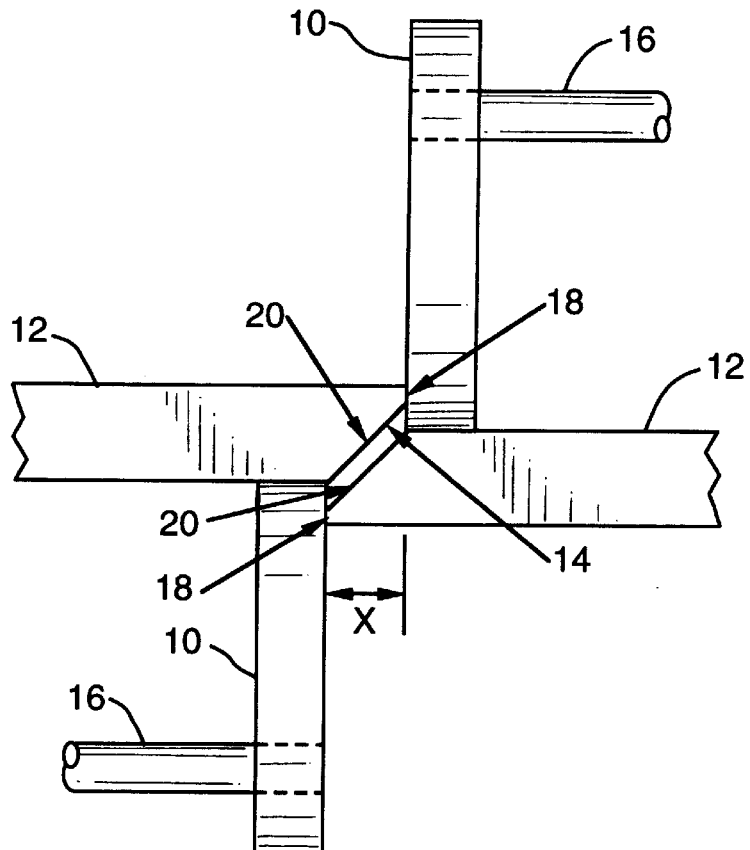

Turning now to the drawings, FIGS. 1a–1c show a pair of rotary knives 10 in operational contact with a metal or other strip 12 to create a new edge 14 therefor. As shown, the knives 10 are positioned with respect to each other such that a horizontal clearance X is defined therebetween.

Each of the knives 10 is supported by a shaft 16 that is, in turn, mounted in a support block or arbor (not shown) by means of, for example, roller bearings. The strip 12 is typically disposed between the support blocks and is fed between the knives 10.

As best shown in FIG. 1b, as the strip 12 moves into contact with the knives 10, the knives 10 initially penetrate or cut the strip 12. The region of penetration 18 into the strip 12 is typically called the "nick."

As shown in FIGS. 1b and 1c, the knives 10 penetrate the strip 12 until the cutting forces exceed the ultimate tensile strength of the strip material and the strip 12 separates. The region of separation 20 of the strip 12 is typically called the "break." Thus, it can be seen that an edge-trimming operation typically has both a cutting and a shearing or fracturing component thereto.

As will be appreciated by those skilled in the art, the depth of penetration into the strip 12 is determined by the ultimate tensile strength of the strip material and its relationship to the yield strength and the thickness of the strip 12.

The quality of the edge 14 formed by the knives 10 can be affected by various conditions, including the relative positioning and operational characteristics of the knives 10, which are discussed in detail in a copending application (Our Docket No. 95-233) filed on Jan. 5, 1996, the contents of which are hereby incorporated by reference. Therefore, by continuously monitoring in real time the quality of the edge 14 formed by the knives 10, an operator will be able to timely determine when an adjustment in the positioning of the knives 10 is required or when the knives 10 need to be replaced.

Edge quality can be monitored, for example, in terms of the burr 22 and the shear angle A of the edge 14 formed by the trimming process. As shown and discussed below, the shear angle A of a strip edge 14 is defined by the angle formed between the "nick" region 18 and the "break" region 20 of the edge 14. Typically, for high-quality edges 14, the shear angle A should remain relatively constant within certain operating parameters, which usually have been empirically determined over time.

As shown and discussed in more detail below, burrs 22 are formed on trimmed edges 14 by, among other things, excess shearing or fracturing pressure being exerted on the edges 14 by the knives 10. This excess pressure can be caused by incorrect or inaccurate horizontal and/or vertical positioning of the knives 10 with respect to one another and the strip 12.

Burrs 22 formed on strip edges 14 can cause safety and operational problems with the strip 12. For example, burrs 22 are often sharp and can consequently lacerate material handlers. In addition, depending on the application, many final products formed from the processed strip 12 cannot have large, or any, burrs thereon. Thus, if the burrs 22 are too large, or cannot be present at all on the strip edge 14, they must be subsequently removed by means of a deburring process, which increases productivity costs and reduces output.

Figure 2:
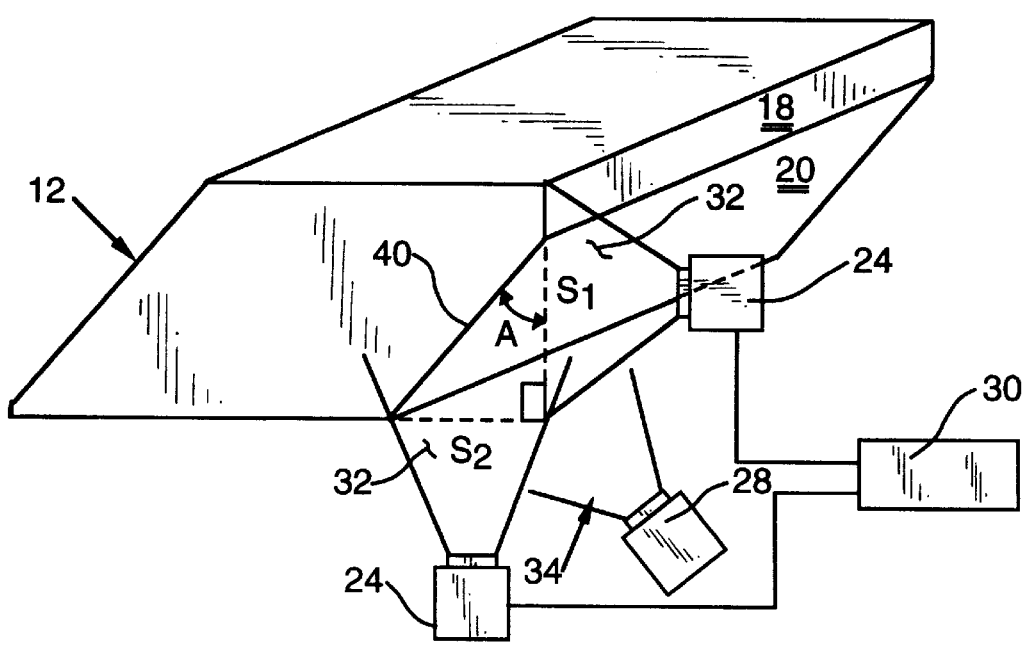
FIG. 2 is a schematic view of a first preferred embodiment of the present invention used to analyze the shear angle of a strip edge.
Figure 3:
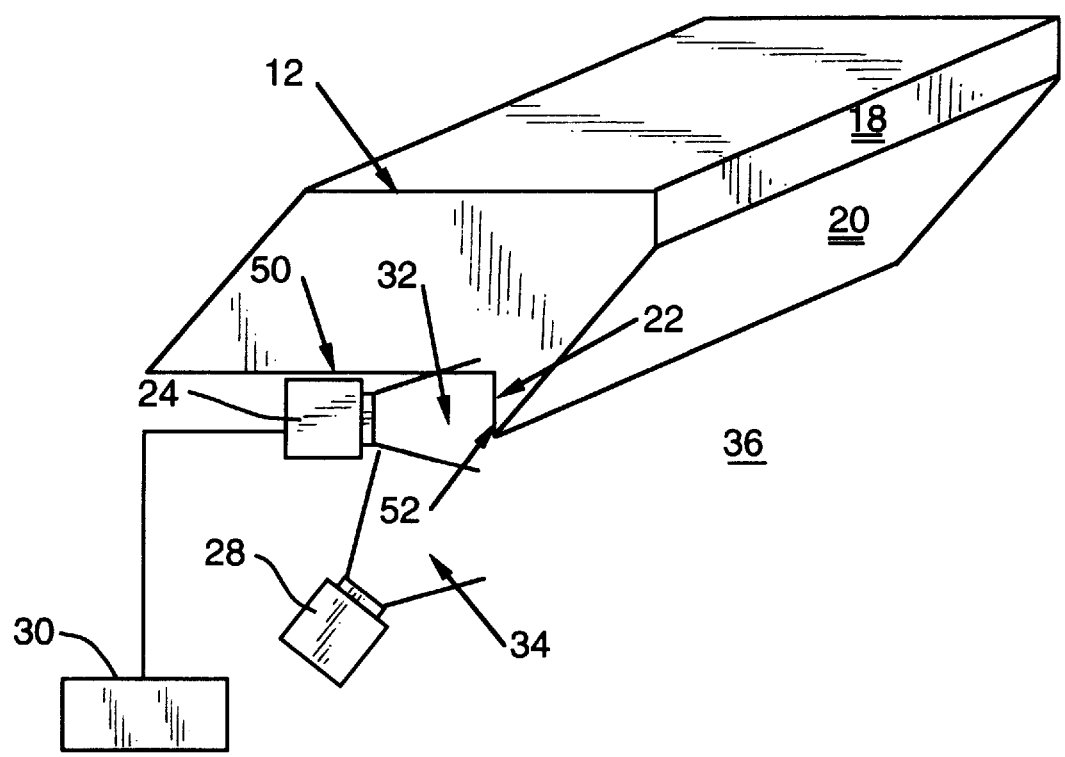
FIG. 3 is a schematic view of a second preferred embodiment of the present invention used to analyze the burr height of a strip edge.

FIGS. 2 and 3 illustrate two preferred embodiments of the present invention used to analyze, respectively, the shear angle A and the burr 22 of a strip edge 14. FIGS. 2 and 3 are both intended to be similar to those shown in FIGS. 1a–1c. However, for clarity and ease of illustration, the knives 10 have been removed from the drawings.

As will become apparent below, FIG. 3 differs from FIG. 2 only in the presence of a burr 22 on the edge 14 and the positioning of the image producer 24, light source 28 and analyzer 30. It should be appreciated that, depending on the specific edge-quality characteristics of the edge 14 being monitored, the image producer 24 and the light source 28 may be positioned in various orientations to frame specific areas of the edge 14.

As shown in FIG. 2, the nick region 18 and the break region 20 of the edge 14 form a shear angle A with respect to each other. As shown, the line 40 along the break region 20 forms the hypotenuse of a triangle having one side $S_1$ and a second side $S_2$. An angle of 90° is formed between sides $S_1$ and $S_2$. Through the side-angle-side (SAS) geometric principle, the shear angle A can be derived if the lengths of sides $S_1$ and $S_2$ can first be determined.

As also shown in FIG. 2, two image producers 24, such as video cameras, are positioned such that their fields of view 32 substantially frame the break region 20 of the edge 14. In a preferred embodiment, one image producer 24 is positioned below the strip 12 and the other image producer 24 is positioned to the side of the strip 12.

In addition, a light source 28 focuses an intense light beam 34 on the nick and break regions 18, 20 of the edge 14. The rest of the beam 34 extends into the relatively dark or "black" area of the background environment 36.

Typically, due to the respective cutting and shearing phenomena that occur on an edge 14 during an edge-trimming operation, the nick and break regions 18, 20 of the edge 14 exhibit different light reflectivity coefficients. Thus, the nick region 18 of the edge 14 may be able to reflect a greater portion of the incident light beam 34 than would the break region 20, or vice-versa. The contrast between the reflectivity of the nick and break regions 18, 20 of the edge 14, and the relative non-reflectivity of the background environment 36, is utilized to provide the monitoring and inspection apparatus and method of the present invention.

As the edge 14 is created by the knives 10 during the edge-trimming operation, the image producers 24 create a series of real-time images of the edge 14. The real-time images of the edge 14 contain a first "bright" area that corresponds to the nick region 18 or the break region 20, and a second, less "bright" area that corresponds to the other of the nick or break regions 18, 20. The "bright" areas are caused by the portion of the light beam 34 that is reflected by the nick and break regions 18, 20 of the edge 14. In addition, the images contain "dark" areas that correspond to the background environment 36. The "dark" areas are caused by the portion of the light beam 34 that is absorbed (i.e., not reflected) by the background environment 36.

By measuring the lengths of the transition zones between the "dark" area that correspond to the background environment 36 and the "bright" or "less bright" areas that correspond to the nick region 18 of the edge 14—i.e., the "bright" or "less bright" areas that correspond to the break region 20—, the dimensions of the sides $S_1$ and $S_2$ can be derived. As discussed above, once the lengths of the sides $S_1$ and $S_2$ are known, the shear angle A can be determined.

As shown in FIG. 3, the apparatus and method of the present invention can also be used to measure the height of a burr 22 formed on the strip edge 14 and extending below the bottom side 50 of the strip 12.

In a preferred embodiment, at least one image producer 24, such as a video camera, is positioned such that its field of view 32 substantially frames the backside 52 of the burr 22. Preferably, the image producer 24 is positioned below and to the left of the strip 12.

In addition, a light source 28 focuses an intense light beam 34 on the backside 52 of the burr 22. The rest of the beam 34 extends into the relatively dark or "black" area of the background environment 36 or onto the bottom side 50 of the strip 12.

As can be ascertained, the backside 52 of the burr 22 will be able to reflect a large amount of the incident light beam 34, especially as compared to the relative non-reflectivity of the background environment 36. The contrast between the reflectivity of the backside 52 of the burr 22 and the relative non-reflectivity of the background environment 36 is utilized to measure the height of the burr 22.

As the edge 14, and thus the burr 22, is created by the knives 10 during the edge-trimming operation, the image producers 24 create a series of real-time images of the edge 14. The real-time images of the edge 14 contain a "bright" area that corresponds to the backside 52 of the burr 22 and a "dark" area that corresponds to the background environment 36. The "bright" and "dark" areas are caused by the portions of the light beam 34 that are, respectively, reflected by the backside 52 of the burr 22 and absorbed (i.e., not reflected) by the background environment 36.

By measuring the length of the "bright" area that corresponds to the backside 52 of the burr 22, the height dimension of the burr 22 can be derived. As can be deduced, the outer dimension of the "bright" area will terminate at the beginning of the "dark" area corresponding to the background environment 36.

As is known in the art, each of the images of the edge 14 formed by the image producers 24 is divided into a number of pixels. For example, a standard "frame grabber" forms images having 512 pixels along the horizontal and 512 pixels along the vertical. Thus, with respect to FIG. 2, the images formed by the image producers 24 will be divided into a large number of "bright, "less bright" and "dark" pixels that define the transition between the nick and break regions 18, 20 of the edge 14 and the background environment 36. In addition, with respect to FIG. 3, the images formed by the image producer 24 will be divided into a number of "bright" and "dark" pixels that define the transition between the backside 52 of the burr 22 and the background environment 36.

The images produced by the image producers 24 are supplied to an analyzer 30, which may be a PC-type computer. Although not shown, the analyzer 30 may include peripherals connected thereto, including one or more display monitors, a keyboard and/or a trackball for operator use and interaction with the monitoring and inspection apparatus.

As discussed below, the analyzer 30 is programmed to digitize the images of the strip 12, and to compare the digitized image information for the shear angle A and the burr height of the edge 14 to standard operating parameters therefor.

The standard operating parameters for shear angle A and burr height may be derived from the line operator's own experience in processing the specific strip stock in issue. For example, by forming images of a high-quality edge, and comparing those images with other images formed for known, poor-quality edges having, for example, unsatisfactory shear angles and burr heights, a line operator may be able to broadly define a set of standard operating parameters for, among other things, shear angle and burr height for strip edge 14.

If the digitized image information falls outside of the standard operating parameters for shear angle or burr height, the analyzer 30 alerts the line operator. The line operator may then independently determine whether the shear angle A or the burr height needs to be adjusted. If the shear angle A or the burr height does need to be adjusted, the knives 10 may then be repositioned, either automatically or manually, or replaced, depending on what is required to remedy the problem. If the knives 10 do not need to be adjusted or replaced, the image information that caused the alert to be given can be utilized by the analyzer 30 to narrow and thereby refine the standard operating parameters for the shear angle A and/or the burr height.

On the other hand, if the analyzer 30 determines that the digitized information falls within the standard operating parameters, the knives 10 are permitted to continue trimming the strip 12.

As discussed above, the image information may be stored and subsequently used to generate a revised set of standard operating parameters for that particular strip 12 and process. Suitable software for handling the above-described information processing will be apparent to those in the data processing art, and does not directly form a part of the present invention. One suitable image processing software is available from Integral Vision Limited of Woburn Industrial Estate, Kempston, Bedford, Great Britain.

It is anticipated that the above-described iterative process will in time result in accurate standard operating parameters being defined for, among other things, the shear angle A and the burr height of the edge 14. As the standard operating parameters are refined, the line operators will be able to rely on them exclusively to determine when the knives 10 in a line operation need to be repositioned or replaced.

The edge characteristics discussed above (i.e., shear angle and burr height) are intended to illustrate the operation and capabilities of the present invention and are not considered to be comprehensive; many additional edge characteristics may be monitored and inspected by the present invention.

The image producers 24 and light sources 28 utilized in the present invention may be oriented or positioned in any suitable manner to monitor and inspect one or more edge characteristics. To operate efficiently, the image producers 24 and the light sources 28 have to be positioned such that the relevant surfaces of the edge 14 are included within their respective fields of view.

Further, depending on the application and the number of edge characteristics that are desired to be monitored and inspected, it should be appreciated that any suitable number of image producers 24 and light sources 28 may be used in the present invention. For example, two light sources 28 may be used with each single image producer 24, or vice-versa.

The following instruments may be used in the present invention: the analyzer 30 may comprise a PC-type computer having at least a 66 Mhz 80486 processor, 8 MB of RAM, 2 camera inputs, 16 digital input/output (24 Volts DC)

and a 400 MB hard disk; the peripherals for the analyzer 30 may include a SVGA monitor, a keyboard and a mouse or trackball; the image producers 24 may comprise "TM-6" series CCD cameras having 75 mm lenses provided by Pulnix; and the light sources 28 may be "Type 800 Microlight" infrared illuminators provided by Dennard.

The present invention, by monitoring in real time the various characteristics of strip edge, allows the knives 10 to be timely adjusted or replaced when they begin to operate outside of normal operating parameters. Such real-time monitoring of the strip edge may prevent the unnecessary scrapping or subsequent re-working of strip product.

It should be appreciated that the apparatus and method of the present invention may be configured and conducted as appropriate for the application. The embodiments described above are to be considered in all respects only as illustrative and not restrictive. The scope of the invention is defined by the following claims rather than by the foregoing description. All changes which come with the meaning and range of equivalency of the claims are to be embraced within their scope.

What is claimed is:

1. A method of monitoring an edge of strip metal, comprising the following steps:

providing at least one image producer having a field of view that substantially frames the edge;

using the at least one image producer to form a first series of images of the edge after the edge has been formed by at least one knife; and analyzing in real time the first series of images to determine the shear angle of the edge.

2. The method of claim 1, further comprising the steps of:

comparing the shear angle determined in step (c) to a standard operating parameter for shear angle;

determining whether the shear angle is within the standard operating parameter; and alerting a line operator if the shear angle is not within the standard operating parameter.

3. The method of claim 2, further comprising the steps of:

forming one or more subsequent series of images of the edge after the edge has been formed by the at least one knife;

analyzing the one or more subsequent series of images to determine the shear angle of the edge;

comparing the shear angle to a standard operating parameter for shear angle;

determining whether the shear angle is within the standard operating parameter; and alerting a line operator if the shear angle is not within the standard operating parameter.

4. The method of claim 1 wherein the at least one image producer provided in step (a) comprises two or more image producers.

5. The method of claim 1 wherein step (a) further comprises providing at least one light source operable to illuminate the edge.

6. The method of claim 1 wherein step (a) further comprises providing an analyzer connectively associated with the at least one image producer.

7. An apparatus for monitoring an edge of strip metal, the apparatus comprising:

at least one image producer having a field of view that substantially frames the edge, said at least one image producer operable to form a first series of images of the edge after the edge has been formed by at least one knife; and an analyzer connectively associated with said at least one image producer, said analyzer operable in real time to determine the shear angle of the edge and to compare the shear angle to a standard operating parameter for shear angle.

8. The apparatus of claim 7 wherein said analyzer is further operable to alert a line operator if the shear angle is not within the standard operating parameter.

9. The apparatus of claim 7 wherein said at least one image producer is operable to form one or more subsequent series of images of the edge after the edge has been formed by the at least one knife, and further wherein said analyzer is operable to analyze the one or more subsequent series of images in real time to determine the shear angle for the edge and to compare the shear angle to the standard operating parameter.

10. The apparatus of claim 7 wherein said at least one image producer comprises two or more image producers.

11. The apparatus of claim 7 wherein said at least one image producer comprises a camera.

12. The apparatus of claim 7 wherein the first series of images comprises a series of video images.

13. The apparatus of claim 7, further comprising at least one light source operable to illuminate the edge.

* * * * *